(12) United States Patent  
Tsengas

(10) Patent No.: US 7,798,106 B1  
(45) Date of Patent: *Sep. 21, 2010

(54) FLIPPING PET CHEW TOY

(75) Inventor: Steven Tsengas, Fairport Harbor, OH (US)

(73) Assignee: OurPet's Company, Fairport Harbor, OH (US)

(*) Notice: Subject to any disclaimer, the term of this patent is extended or adjusted under 35 U.S.C. 154(b) by 538 days.

This patent is subject to a terminal disclaimer.

(21) Appl. No.: 11/260,799

(22) Filed: Oct. 28, 2005

Related U.S. Application Data

(63) Continuation-in-part of application No. 10/755,160, filed on Jan. 12, 2004, now Pat. No. 7,032,541.

(51) Int. Cl.  
*A01K 29/00* (2006.01)

(52) U.S. Cl. ...................................... 119/710

(58) Field of Classification Search ................. 119/702, 119/707–711  
See application file for complete search history.

(56) References Cited

U.S. PATENT DOCUMENTS

| | | | | |
|---|---|---|---|---|
| 422,370 | A * | 3/1890 | Brott | 426/143 |
| 740,858 | A * | 10/1903 | Hosmer | 426/143 |
| 809,100 | A * | 1/1906 | Diener | 426/94 |
| D139,389 | S * | 11/1944 | Fleming | D24/194 |
| 2,610,851 | A * | 9/1952 | Jones | 119/710 |
| 4,229,484 | A * | 10/1980 | Steels et al. | 426/279 |
| 4,334,382 | A * | 6/1982 | Chase et al. | 446/490 |
| 4,390,148 | A * | 6/1983 | Cudmore | 244/19 |
| 4,802,444 | A * | 2/1989 | Markham et al. | 119/710 |
| RE34,352 | E * | 8/1993 | Markham et al. | 119/710 |
| 5,538,744 | A * | 7/1996 | Miller et al. | 426/94 |
| 5,595,142 | A * | 1/1997 | Chill | 119/710 |
| 5,652,005 | A * | 7/1997 | Loalbo | 426/76 |
| D387,513 | S * | 12/1997 | Mauldin, Jr. | D30/160 |
| D393,110 | S * | 3/1998 | Mauldin, Jr. | D30/160 |
| 5,782,868 | A * | 7/1998 | Moore et al. | 606/235 |
| D400,620 | S * | 11/1998 | Barton, Jr. | D21/713 |
| 5,832,877 | A * | 11/1998 | Markham | 119/710 |
| 5,857,431 | A * | 1/1999 | Peterson | 119/710 |
| 5,865,146 | A * | 2/1999 | Markham | 119/707 |
| D407,869 | S * | 4/1999 | Wang | D30/160 |
| D411,303 | S * | 6/1999 | Scagliotti | D24/194 |
| 5,935,628 | A * | 8/1999 | Hauser et al. | 426/143 |
| D427,391 | S * | 6/2000 | Gill | D30/160 |
| 6,098,571 | A * | 8/2000 | Axelrod et al. | 119/707 |
| 6,112,703 | A * | 9/2000 | Handelsman | 119/707 |
| 6,129,053 | A * | 10/2000 | Markham et al. | 119/710 |
| D448,138 | S * | 9/2001 | Gokturk | D1/106 |
| 6,427,634 | B1 * | 8/2002 | Mann | 119/709 |
| 6,439,166 | B1 * | 8/2002 | Markham | 119/710 |
| 6,470,830 | B2 * | 10/2002 | Mann | 119/709 |
| 6,546,896 | B1 * | 4/2003 | Markham | 119/709 |
| D475,487 | S * | 6/2003 | DeAngelis | D30/160 |
| D477,441 | S * | 7/2003 | Willinger et al. | D30/160 |

(Continued)

*Primary Examiner*—Thomas Price  
(74) *Attorney, Agent, or Firm*—John D. Gugliotta, PE, Esq.

(57) ABSTRACT

A flipping pet toy is provided having a first bore and a second bore parallelly disposed to the first bore. A series of ribs interstitial spaces there between are concentrically disposed about a central axis of the bores. A thin and laterally elongated body member forms a resilient, thin walled body circumscribing the bores such that said thin wall is capable of generating a resilient, springing action.

8 Claims, 3 Drawing Sheets

U.S. PATENT DOCUMENTS

| | | | |
|---|---|---|---|
| 6,601,538 B1 * | 8/2003 | Viola | 119/709 |
| D479,897 S * | 9/2003 | Willinger | D30/160 |
| D489,494 S * | 5/2004 | Silverglate | D30/160 |
| D493,579 S * | 7/2004 | DeAngelis | D30/160 |
| 7,032,541 B1 * | 4/2006 | Tsengas | 119/710 |
| 7,194,981 B2 * | 3/2007 | Kirch et al. | 119/710 |
| 7,234,420 B1 * | 6/2007 | Tsengas | 119/710 |
| D549,889 S * | 8/2007 | Winkler et al. | D30/160 |
| 7,285,127 B2 * | 10/2007 | Jewett | 606/234 |
| D556,392 S * | 11/2007 | Rutherford et al. | D30/160 |
| 7,320,296 B2 * | 1/2008 | Morrison | 119/707 |
| 7,506,614 B1 * | 3/2009 | Tsengas | 119/710 |
| 7,555,997 B2 * | 7/2009 | Wolfe et al. | 119/707 |

* cited by examiner

FLIPPING PET CHEW TOY

RELATED APPLICATIONS

There present invention is a Continuation in Part of U.S. Ser. No. 10/755,160, filed on Jan. 12, 2004 now U.S. Pat. No. 7,032,541, and incorporated by reference as if fully rewritten herein.

BACKGROUND OF THE INVENTION

1. Field of the Invention

The present invention relates generally to a pet toy and, more particularly, to a pet toy that provides a "flipping" or "jumping" motion when interacted with by a pet.

2. Description of the Related Art

There are many pet toys available that provide entertainment to the pet and the owner, including pet toys that dispense treats upon rolling or movement of the toy. However, these toys provide for the insertion of the treats into cavities within the toy and for dispensing based on movement or rotation of the toy. The present invention is markedly different by providing external ribs and spaces between the ribs for impinging the treats so that the pet may physically extract the treats. This provides exercise to the muscles, strengthens teeth and gums, and extracts harmful plaque from the teeth of a pet. These, among other disclosed advantages and features, overcome many of the deficiencies outlined and inherent within the known prior art.

A search of the prior art did not disclose any patents that read directly on the claims of the instant invention; however, the following references were considered related:

U.S. Pat. Nos. 6,557,496 and 6,484,671, each issued in the name of Herrenbruck, disclose a treat dispensing toy having an exit allowing treats to be dispensed;

U.S. Pat. No. 6,427,634, issued in the name of Mann, discloses a pet toy having a trapper cavity for insertion of an animal attractant;

U.S. Pat. No. 6,158,391, issued in the name of Simonetti, discloses a treat dispensing toy having a pair of spaced disk portions and structured to enable treats to be dispensed from an interior chamber when an animal causes rotation of the toy;

U.S. Pat. No. 5,956,182, issued in the name of Lindgren, discloses an animal chew and play toy and a treat container;

U.S. Pat. No. 5,947,061, issued in the name of Markham et al., discloses a pet toy product with integral treats receiving receptacles for removably holding one or more animal treats;

U.S. Pat. No. 5,553,570, issued in the name of Van Natter, III et al., discloses a disc-shaped animal retrieval toy having a treat container;

U.S. Patent Application Publication 2003/0096554 A1, in the name of Persall, discloses a multipurpose disc toy useful as a water and food dish for a pet; and U.S. Patent Application Publication 2003/0205206 A1, in the name of Natale et al., discloses a dog bone holder.

Consequently, there exists a continuous need for new ideas and enhancements for existing products in the pet toy industry.

SUMMARY OF THE INVENTION

It is therefore an object of the present invention to provide a pet chew toy for holding consumable treats comprising a body member with a plurality of ribs and a plurality of interstitial spaces therebetween, a consumable treat "T" inserted between adjacent ribs and into the space.

It is a feature of the present invention to provide a pet toy comprising a bore concentrically disposed to the ribs and spaces.

It is another feature of the present invention to provide a pet toy comprising ribs and spaces helically disposed about the bore.

It is another feature of the present invention to provide a pet toy comprising ribs and spaces directionally disposed parallel to the bore.

It is another feature of the present invention that, if formed with a sufficiently narrow sidewall, will provide a resilient springing action to cause "flipping" or "jumping" when interacted with by a pet.

It is another feature of the present invention to provide a pet toy comprising a plurality of apertures formed in the body member for dispensing a flavored liquid, solid or semi-solid material and/or a scented aroma.

Briefly described according to one embodiment of the present invention, a pet chew toy for holding consumable treats comprises a body member having a plurality or ribs and a plurality of interstitial spaces formed between the ribs. The ribs and spaces cooperatively act to impinge a treat or treats inserted therein. The ribs and spaces may be disposed substantially parallel to the direction of the bore and a central axis, or may be disposed helically about the bore. The bore may be enclosed at one or both ends by threaded caps, heat bonded caps, or a combination thereof. A sound module may be provided within the bore for emitting a prerecorded or mechanically generated sound upon activation of the sound module. Alternately, if the toy is formed into narrow enough 'slices', a resilient, springing sidewall is formed that can result in a flipping or jumping motion when interacted with by a pet.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
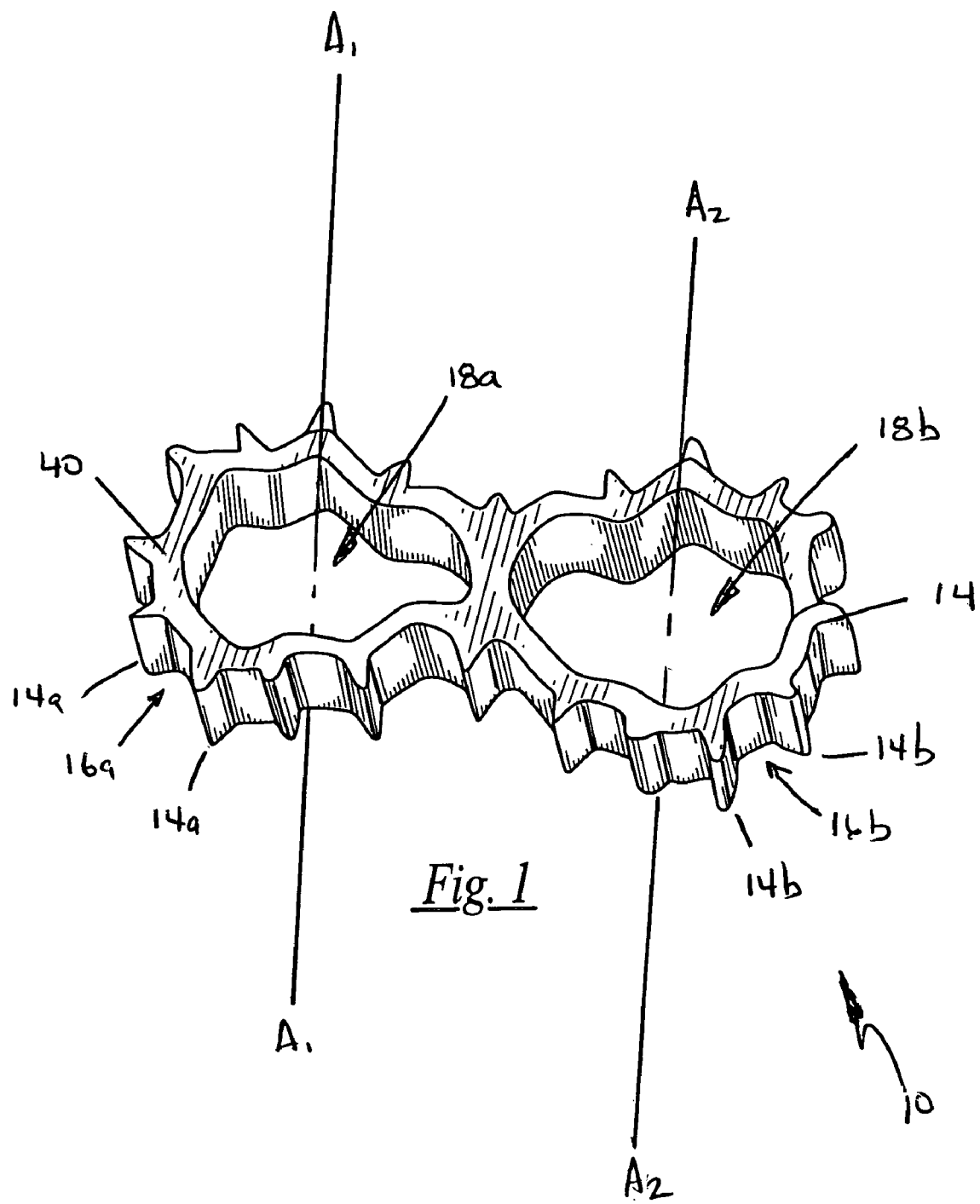
FIG. 1 is perspective view of a flipping pet chew toy according to the preferred embodiment of the present invention.
Figure 2:
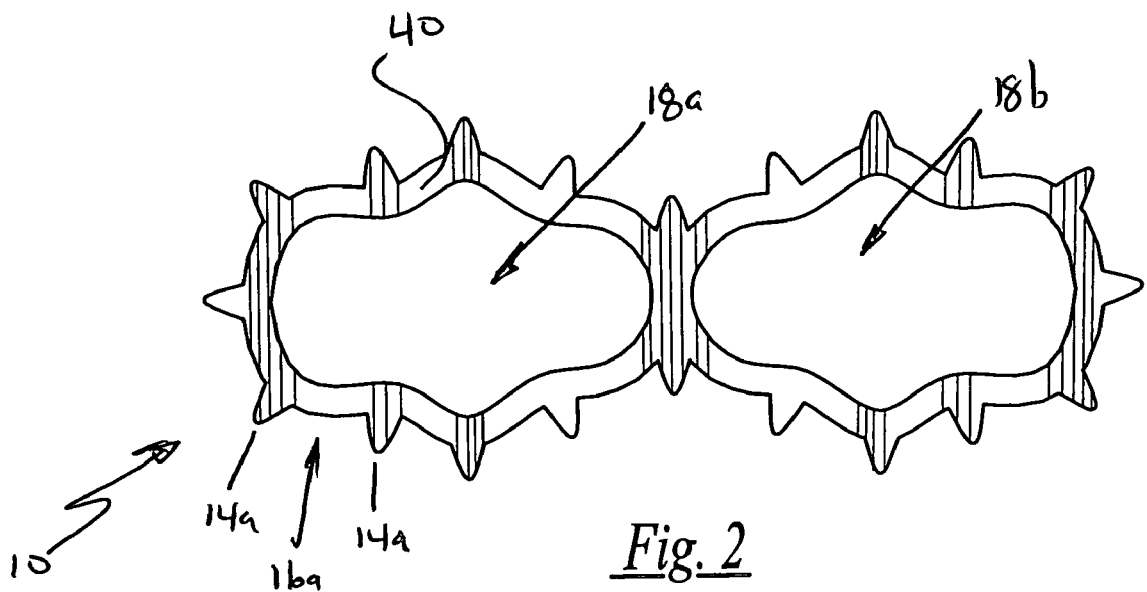
FIG. 2 is front elevational view thereof, the rear elevational view being a mirror image.
Figure 3:
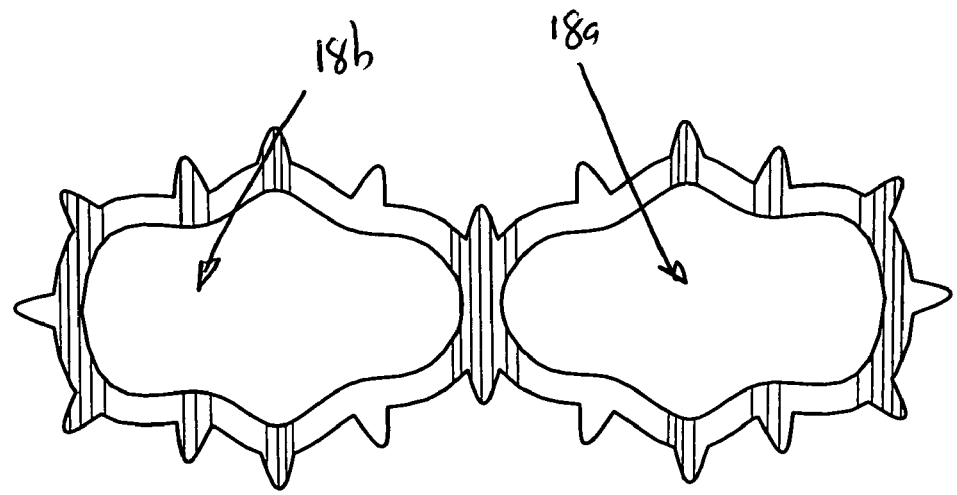
FIG. 3 is a top plan view thereof, the bottom plan view being a mirror image.
Figure 4:
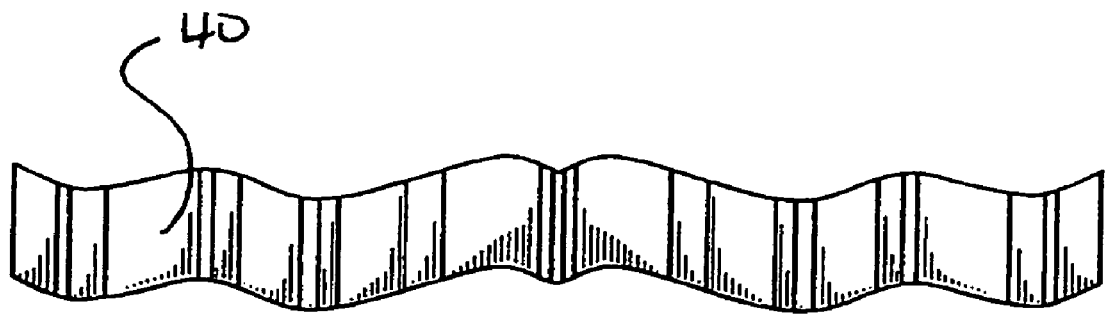
FIG. 4 is a side plan view thereof, the opposite side view being a mirror image; and, FIG. 5 is a side plan view thereof, wherein the embodiment includes ribs disposed helically about the bores.
Figure 5:
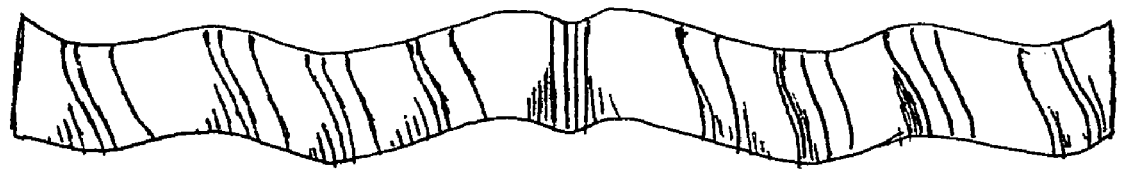

The best mode for carrying out the invention is presented in terms of its preferred embodiment, herein depicted within FIGS. 1 through 4.

1. Detailed Description of the Figures

Referring now to FIG. 1-4, a flipping pet toy according to the preferred embodiment of the present invention is shown in which the toy 12 comprises a first bore 18a and a second bore 18b parallelly disposed to the first bore18a. The plurality of ribs 14 comprise a first series of ribs 14a and a first series of interstitial spaces 16a there between concentrically disposed about a central axis "A1" of the first bore 18a, and a second series of ribs 14b and a second series of interstitial spaces 16b there between concentrically disposed about a central axis "A2" of the second bore 18b.

In greater detail, a first series of ribs 14a and a first series of interstitial spaces 16a there between disposed about a central axis "A1" of the first bore 18a, and a second series of ribs 14b and a second series of interstitial spaces 16b there between disposed about a central axis "A2" of the second bore. The toy 12 is preferably manufactured via an extrusion molding process from an elastomeric product (such as thermoset or thermoplastic high tear strength material). The configuration of the present invention includes a number of protrusions (generally symmetrical to a central axis) which are likely to adhere or stick to a mold in another molding process, such as injection molding. The adhesion of the material to the mold results in increased costs and inefficient production, thus extrusion molding of the present invention is superior to other types of molding processes from a cost saving and efficiency concerned point of view.

2. Operation of the Preferred Embodiment

It has been found that when the toy 10 is cut or manufactured with a very narrow sidewall 40, it can be an effective play device for a pet, especially felines. The toy 10 when chased or batted generates a "flipping" and randomly bouncing motion that stimulates a feline to chase and further interact. By providing this stimulation, the pet must exert energy, exercise jaw and head muscles, using the teeth and gums, thus the exercise muscles of the head and neck, and strengthens teeth and gums, and removes harmful plaque from the teeth and gumlines.

The toy 10 is envisioned as being adaptable for manufacture directed to variously sized animals, including the various breeds of canines. Thus, the toy 10 may be manufactured in sizes for small breeds, medium size breeds and large breeds, respectively. It is envisioned that the diameters may vary in a range from one inch to four inches, and that the lengths may vary in range from two inches to approximately twelve inches.

It is envisioned that other styles and configurations of the present invention can be easily incorporated into the teachings of the present invention, and only one particular configuration shall be shown and described for purposes of clarity and disclosure and not by way of limitation of scope.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A pet chew toy comprising;
   a laterally elongated body member, said laterally elongated body member forming a resilient walled body circumscribing at least a first bore that travels across said laterally elongated body such that said wall forms a width that is thin along a lateral plane and is capable of generating a resilient, springing action; and
   said wall forming a side having a length of a dimension substantially greater than said width such that said resilient, springing action is generated substantially across said lateral plane.

2. The toy of claim 1, wherein said body member comprises second bore, said first and said second bores are both concentrically disposed to said wall, said side further comprises a plurality of ribs and a plurality of interstitial spaces.

3. The toy of claim 2, wherein at least one consumable treat may be impinged in either or both of said first or said second bore.

4. The toy of claim 2, wherein each one of said plurality of ribs is substantially parallel to a central axis of said body member.

5. The toy of claim 2, wherein each one of said plurality of ribs is substantially helical to a central axis of said body member.

6. The toy of claim 1, further comprising a second bore, said second bore is parallelly disposed to said first bore.

7. The pet toy of claim 6, further comprising:
   a first series of ribs and a first series of interstitial spaces there between substantially disposed in a direction parallel to a central axis of said first bore; and
   a second series of ribs and a second series of interstitial spaces there between substantially disposed in a direction parallel to a central axis of said second bore.

8. The pet toy of claim 6, further comprising:
   a first series of ribs and a first series of interstitial spaces there between helically disposed about a central axis of said first bore; and
   a second series of ribs and a second series of interstitial spaces there between helically disposed about a central axis of said second bore.

* * * * *